US012675017B2

(12) United States Patent
Guo et al.

(10) Patent No.: US 12,675,017 B2
(45) Date of Patent: Jul. 7, 2026

(54) ARRAY SUBSTRATE AND DISPLAY APPARATUS

(71) Applicants: Wuhan BOE Optoelectronics Technology Co., Ltd., Wuhan (CN); BOE Technology Group Co., Ltd., Beijing (CN)

(72) Inventors: Yuanhui Guo, Beijing (CN); Chuang Chen, Beijing (CN); Toshifumi Yagi, Beijing (CN); Lei Liu, Beijing (CN)

(73) Assignees: Wuhan BOE Optoelectronics Technology Co., Ltd., Wuhan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/644,025

(22) Filed: Apr. 23, 2024

(65) Prior Publication Data
US 2024/0361643 A1 Oct. 31, 2024

Related U.S. Application Data

(63) Continuation of application No. PCT/CN2023/090525, filed on Apr. 25, 2023.

(51) Int. Cl.
*G02F 1/1343* (2006.01)
*G02F 1/1362* (2006.01)

(52) U.S. Cl.
CPC .. *G02F 1/134309* (2013.01); *G02F 1/136286* (2013.01)

(58) Field of Classification Search
CPC .................. G02F 1/134309; G02F 1/136286
USPC ......................................................... 349/139
See application file for complete search history.

(56) References Cited

U.S. PATENT DOCUMENTS

| | | | |
|---|---|---|---|
| 2007/0152930 A1* | 7/2007 | Jin | G02F 1/1323 345/87 |
| 2016/0062203 A1* | 3/2016 | Ono | G02F 1/13439 438/30 |
| 2019/0302542 A1* | 10/2019 | Shimoshikiryoh | G02F 1/133753 |

FOREIGN PATENT DOCUMENTS

| | | | | |
|---|---|---|---|---|
| CN | 103257480 A | 8/2013 | | |
| CN | 104516162 A | * 4/2015 | ....... | G02F 1/133707 |
| CN | 104808402 B | 2/2018 | | |
| CN | 107728385 A | 2/2018 | | |
| CN | 108351557 A | * 7/2018 | ....... | G02F 1/133707 |
| CN | 110320709 A | 10/2019 | | |

(Continued)

OTHER PUBLICATIONS

CN 202380008775.0 first office action dated May 16, 2025.

*Primary Examiner* — Michael H Caley
(74) *Attorney, Agent, or Firm* — IPro, PLLC

(57) ABSTRACT

An array substrate and a display apparatus are provided. The array substrate includes: a substrate (1); a first common electrode layer (2) on a side of the substrate (1); and a pixel electrode layer (3) on a side of the first common electrode layer (2) away from the substrate (1), including a plurality of pixel electrode rows (30) extending along a first direction (X) and arranged along a second direction (Y). The pixel electrode row (30) includes a plurality of pixel electrodes (31) arranged along the first direction (X). Part of regions of the pixel electrodes (31) is a slit structure (310) and part of regions of the pixel electrodes is a block structure, and in the same pixel electrode row (30), the slit structures (310) of adjacent pixel electrodes (31) are located at different positions in the adjacent pixel electrodes (31).

11 Claims, 6 Drawing Sheets

(56)         References Cited

FOREIGN PATENT DOCUMENTS

| CN | 211014958 U | 7/2020 | |
| CN | 113589603 A | 11/2021 | |
| CN | 113759613 A | 12/2021 | |
| CN | 115561937 A | 1/2023 | |
| CN | 115877620 A * | 3/2023 | ....... G02F 1/134309 |

* cited by examiner

Liquid crystal molecule          Dark line

Liquid crystal molecule          Dark line

1

ARRAY SUBSTRATE AND DISPLAY APPARATUS

CROSS REFERENCE TO RELATED APPLICATIONS

The present disclosure is a continuation application of International Application of International Application No. PCT/CN2023/090525, filed Apr. 25, 2023, the entire content of which is incorporated herein by reference.

TECHNICAL FIELD

The present disclosure relates to the field of semiconductor technologies, in particular to an array substrate and a display apparatus.

BACKGROUND

The name UV2A is derived from the multiplication of ultraviolet (UV) and a liquid crystal panel in the vertical alignment VA mode. This technology can precisely control the alignment of liquid crystal molecules through ultraviolet rays, greatly improving the light transmittance.

The key of UV2A is to control the tilt of liquid crystal molecules along the UV direction with high accuracy by using a special polymer material that serves as an alignment film. The UV2A has an advantage in that the liquid crystal panel is of a simple construction without protrusions and slits. First of all, the absence of redundant protrusions increases the opening rate of each pixel by at least 20%. In addition, light of a conventional backlight is scattered at protruding and slit portions, causing light leakage in the front, and thus blackness appears. However, UV2A technology will not cause light leakage at both protruding and slit portions, so the static contrast ratio is improved, for example, it can reach 5000:1.

As one of the mainstream solutions for panels in the future, 8K ultra-high-definition resolution (7680×4320) display products have high requirements on both color shift and transmittance.

SUMMARY

Embodiments of the present disclosure provide an array substrate, including:

a substrate;

a first common electrode layer on a side of the substrate; and a pixel electrode layer on a side of the first common electrode layer away from the substrate, including a plurality of pixel electrode rows extending along a first direction and arranged along a second direction, where each of the plurality of the pixel electrode rows includes a plurality of pixel electrodes arranged along the first direction, part of regions of each pixel electrode is a slit structure and part of regions of the pixel electrode is a block structure, and in the same pixel electrode row, slit structures of adjacent pixel electrodes are located at different positions in the adjacent pixel electrodes.

In a possible implementation, the pixel electrode row includes a first pixel electrode and a second pixel electrode arranged alternately along the first direction; in different first pixel electrodes, positions of slit structures are the same, and in different second pixel electrodes, positions of slit structures are the same; a position of a slit structure in the first pixel electrode is different from a position of a slit structure in the second pixel electrode.

In a possible implementation, first pixel electrodes may be located in the same column, and second pixel electrodes may be located in the same column.

In a possible implementation, in the same column of pixel electrodes, the first pixel electrode and the second pixel electrode are arranged alternately.

In a possible implementation, the pixel electrode includes a first sub-electrode part, a second sub-electrode part, a third sub-electrode part and a fourth sub-electrode part arranged along the second direction;

only two of the first sub-electrode part, the second sub-electrode part, the third sub-electrode part and the fourth sub-electrode part have the slit structure.

In a possible implementation, among the first sub-electrode part, the second sub-electrode part, the third sub-electrode part and the fourth sub-electrode part, the two having the slit structure are adjacent to each other.

In a possible implementation, among the first sub-electrode part, the second sub-electrode part, the third sub-electrode part and the fourth sub-electrode part, the two having the slit structure are separated by the block structure.

In a possible implementation, among the first sub-electrode part, the second sub-electrode part, the third sub-electrode part and the fourth sub-electrode part within the same pixel electrode, the slit structures in the two provided with the slit structures have different extension directions.

In a possible implementation, in the first pixel electrode, the first sub-electrode part and the second sub-electrode part have the slit structure; in the second pixel electrode, the third sub-electrode part and the fourth sub-electrode part have the slit structure.

In a possible implementation, an extension direction of the slit structure of the third sub-electrode part in the second pixel electrode is the same as an extension direction of the slit structure of the first sub-electrode part in the first pixel electrode;

an extension direction of the slit structure of the fourth sub-electrode part in the second pixel electrode is the same as an extension direction of the slit structure of the second sub-electrode part in the first pixel electrode.

In a possible implementation, in the first pixel electrode, the first sub-electrode part and the fourth sub-electrode part have the slit structure; in the second pixel electrode, the second sub-electrode part and the third sub-electrode part have the slit structure.

In a possible implementation, an extension direction of the slit structure of the second sub-electrode part in the second pixel electrode is the same as an extension direction of the slit structure of the fourth sub-electrode part in the first pixel electrode;

an extension direction of the slit structure of the third sub-electrode part in the second pixel electrode is the same as an extension direction of the slit structure of the first sub-electrode part in the first pixel electrode.

In a possible implementation, the first sub-electrode part, the second sub-electrode part, the third sub-electrode part and the fourth sub-electrode part have the same outer contour shape and equal areas.

In a possible implementation, the array substrate further includes: a data line layer on a side of the first common electrode layer away from the pixel electrode layer.

In a possible implementation, the data line layer includes a plurality of data lines extending along the second direction; an orthographic projection of the pixel electrode on the substrate has an overlapping region with an orthographic projection of the data line on the substrate.

In a possible implementation, an orthographic projection of the first common electrode layer on the substrate covers an orthographic projection of the data line on the substrate.

In a possible implementation, the material of the first common electrode layer is the same as the material of the pixel electrode layer.

Embodiments of the present disclosure further provide a display apparatus, including the array substrate as provided by the embodiments of the present disclosure, and further including an opposite substrate opposite to the array substrate; the opposite substrate is provided with a second common electrode layer, and a signal applied to the second common electrode layer is the same as a signal applied to the first common electrode layer.

DETAILED DESCRIPTION

Figure 1A:
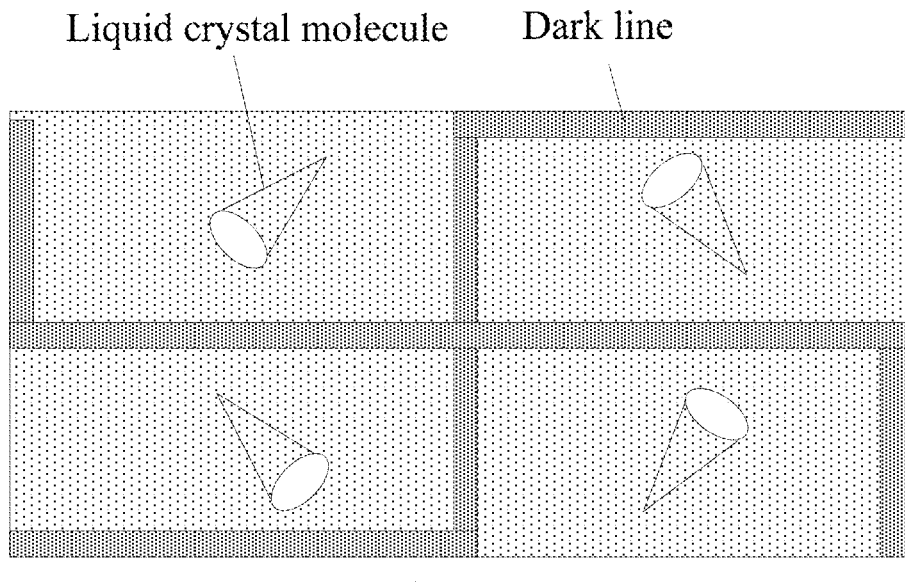
FIG. 1A is a liquid crystal twist diagram in a UV2A mode.

In order to make the purpose, technical solutions and advantages of the embodiments of the present disclosure clearer, the technical solutions of the embodiments of the present disclosure will be clearly and completely described below in conjunction with the drawings of the embodiments of the present disclosure. It should be noted that a size and a shape of each figure in the drawings do not reflect true scales, and are merely to illustrate contents of the present disclosure. Identical or similar reference numerals denote identical or similar elements or elements having identical or similar functions throughout. Apparently, the described embodiments are some of the embodiments of the present disclosure, not all of them. Based on the described embodiments of the present disclosure, all other embodiments obtained by those skilled in the art without creative effort fall within the claimed scope of the present disclosure.

Unless otherwise defined, the technical terms or scientific terms used herein shall have the usual meanings understood by those of ordinary skill in art to which the present disclosure belongs. "First", "second" and similar words used in the description and claims of the present disclosure do not indicate any order, quantity or importance, but are only used to distinguish different components. "Comprising" or "including" and similar words mean that the elements or items appearing before the word include the elements or items listed after the word and their equivalents, without excluding other elements or items. "Inside", "outside", "up", "down" and so on are only used to indicate the relative positional relationship. When the absolute position of the described object changes, the relative positional relationship may also change accordingly.

"About" or "approximately the same" as used herein is inclusive of the stated value and means within an acceptable range of deviation for the particular value as determined by those skilled in the art, considering the measurement in question and the error associated with measurement of the particular quantity (i.e., the limitations of the measurement system). For example, "approximately the same" can mean within one or more standard deviations, or within ±30%, ±20%, ±10%, ±5% of the stated value.

In the drawings, thicknesses of layers, films, panels and regions are enlarged for clarity. Exemplary embodiments are described herein with reference to cross section diagrams that are schematic diagrams of idealized embodiments. As such, variations from the shapes of the diagrams as a result, for example, of manufacturing techniques and/or tolerances, are to be expected. Thus, embodiments described herein should not be construed as being limited to the particular shapes of regions as illustrated herein but including deviations in shapes that result, for example, from manufacturing. For example, a region illustrated or described as flat may, typically, have rough and/or nonlinear features. Moreover, sharp angles that are illustrated may be rounded. Thus, the regions illustrated in the drawings are schematic in nature and their shapes are not intended to illustrate the precise shape of a region and are not intended to limit the scope of the present claims.

In order to keep the following description of the embodiments of the present disclosure clear and concise, in the present disclosure, detailed descriptions of known functions and known components are omitted.

Figure 1B:
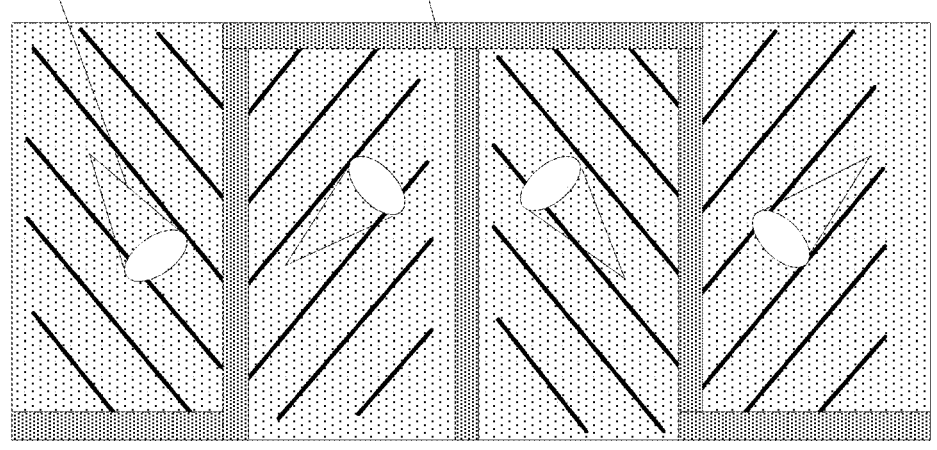
FIG. 1B is an SUVA liquid crystal twist diagram.

As shown in FIG. 1A and FIG. 1B, a liquid crystal twist diagram in a UV2A mode is shown in FIG. 1A, and a superfine photo-alignment (SUVA) liquid crystal twist diagram is shown in FIG. 1B. Compared with the traditional UV2A mode, the exposure method of the SUVA process, which is an upgraded version of UV2A, not only provides a conventional vertical electric field, but also enables the formation of a parallel electric field because of a slit structure contained therein. The dark lines in the SUVA mode are significantly reduced, which can effectively improve the transmittance of the UV2A mode. Although the SUVA mode has high transmittance, compared to the 2×2 grid-shaped arrangement of UV2A, the transverse-domain arrangement (where branch electrodes are disposed to extend transversely, see FIG. 1B) of SUVA is longer and is not suitable for 8-domain products. Thus, for high resolution products, such as 8K products, if the UV2A mode is used, the transmittance is low; if the SUVA design in which transmittance is taken into account is used, it is not suitable for an 8-domain design, and will have poor color shift.

Figure 2A:
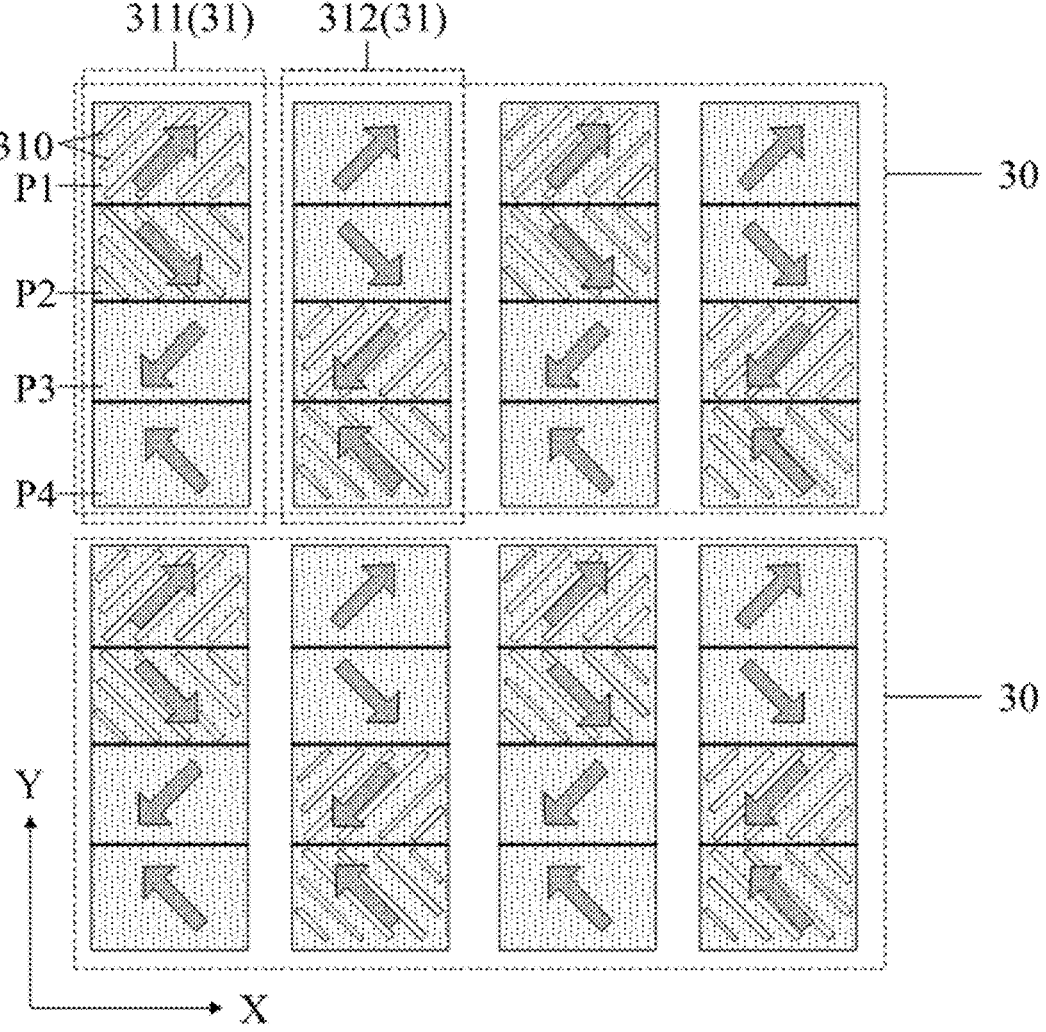
FIG. 2A is a first schematic top diagram of a pixel electrode layer provided by embodiments of the present disclosure.
Figure 2B:
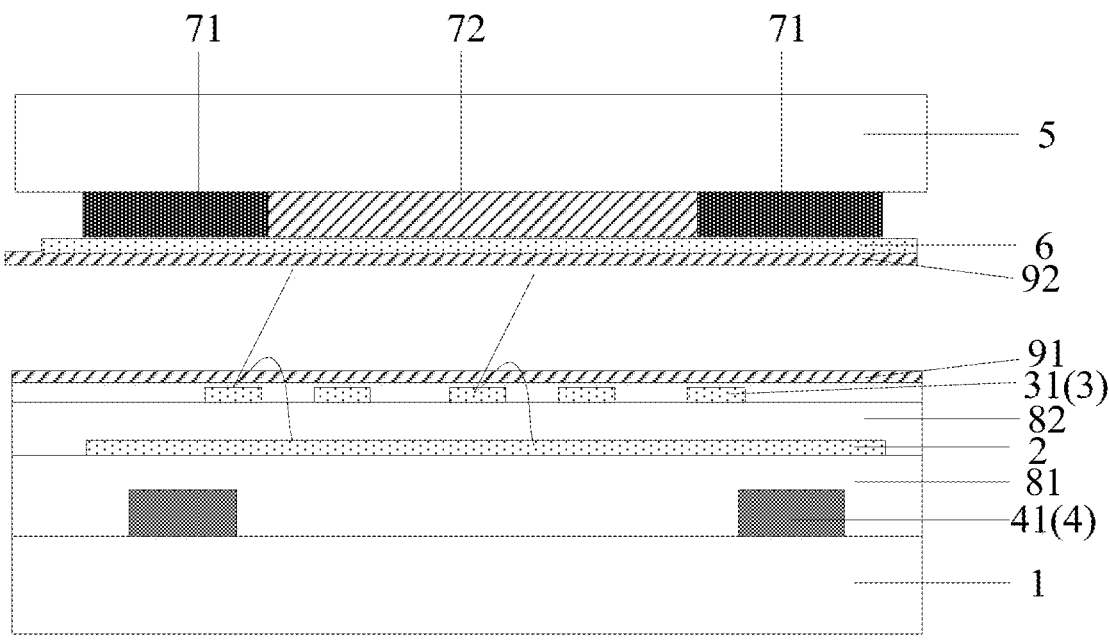
FIG. 2B is a schematic sectional diagram of a slit structure in FIG. 2A.
Figure 2C:
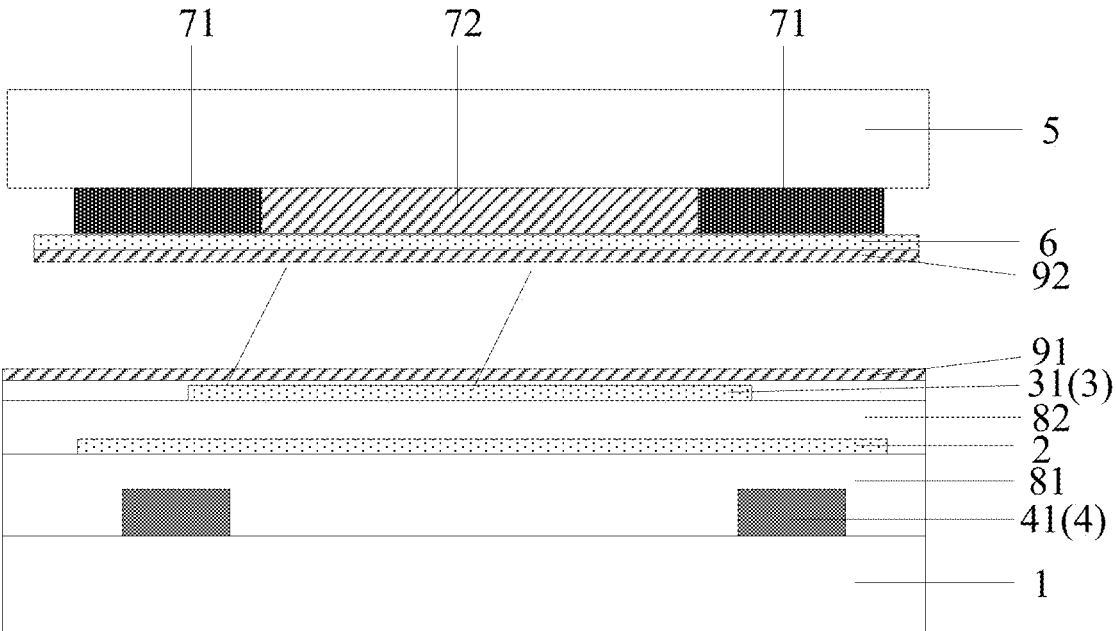
FIG. 2C is a schematic sectional diagram of a block structure in FIG. 2A.
Figure 3:
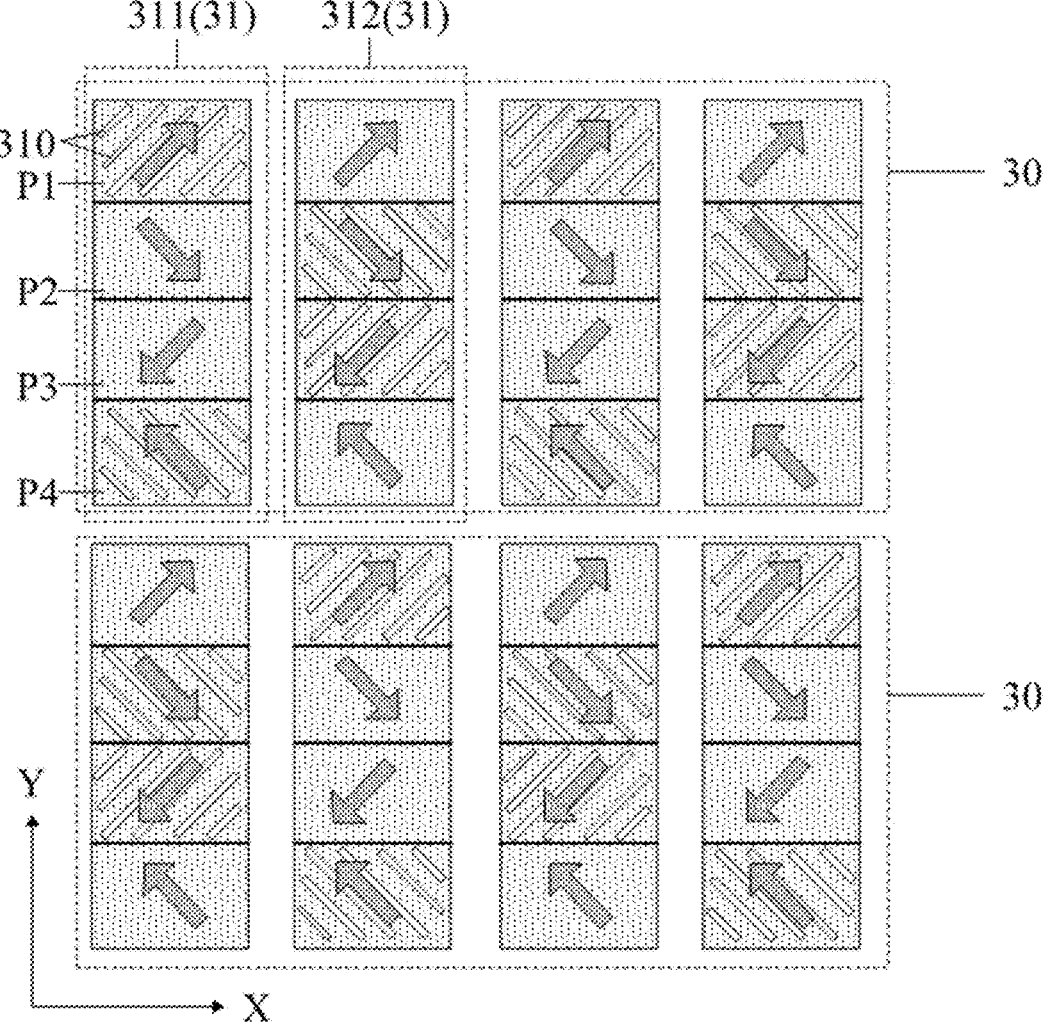
FIG. 3 is a second schematic top diagram of a pixel electrode layer provided by embodiments of the present disclosure.

In view of this, referring to FIGS. 2A-2C and FIG. 3, FIG. 2A is a schematic sectional diagram of an array substrate provided by embodiments of the present disclosure, FIG. 2B is a schematic sectional diagram of a slit structure in FIG. 2A, FIG. 2C is a schematic sectional diagram of a block structure in FIG. 2A; FIG. 3 is a schematic sectional diagram of another array substrate provided by embodiments of the present disclosure. Embodiments of the present disclosure provide an array substrate, including:

a substrate 1;
a first common electrode layer 2 on a side of the substrate 1; and a pixel electrode layer 3 on a side of the first common electrode layer 2 away from the substrate 1, including a plurality of pixel electrode rows 30 extending along a first direction X and arranged along a second direction Y, where each of the pixel electrode rows 30 includes a plurality of pixel electrodes 31 arranged along the first direction X, part of regions of each pixel electrode 31 a slit structure 310 and part of regions of the pixel electrode is a block structure, and in the same pixel electrode row 30, the slit structures 310 of adjacent pixel electrodes 31 are located at different positions in the pixel electrodes 31. Specifically, for example, as shown in FIG. 2A, in the first pixel electrode 31 from the left in the upper pixel electrode row 30, the slit structure 310 is located at an upper position of the pixel electrode 31, and in the second pixel electrode 31 adjacent thereto, the slit structure 310 is located at a lower position of the pixel electrode 31. Referring to FIG. 2B, in the direction perpendicular to the substrate 1, the pixel electrodes 31 overlap with the first common electrode layer 2. Optionally, the first common electrode layer 2 is a plate-shaped electrode.

In the embodiments of the present disclosure, the first common electrode layer 2 is provided at a side of the pixel electrode layer 3 facing the substrate 1, the first common electrode layer 2 may shield signals therebelow, the pixel electrode 31 may be designed without considering the interference caused by overlapping with other signals, and the area of the pixel electrode 31 may be made larger than that of a conventional pixel electrode. When the array substrate is applied to a display panel, the liquid crystal capacitance (Cst, that is, a capacitance formed by the pixel electrode on the array substrate and a second common electrode layer on an opposite substrate) of the display panel can be increased and the opening rate of the display panel can be improved. Moreover, when a voltage is applied to the pixel electrode 31 and the first common electrode layer 3, the pixel electrode 31 not only forms a vertical electric field with the second common electrode layer 6 of the opposite substrate, but also forms a horizontal electric field with the first common electrode layer 2, where the vertical electric field is effective in affecting the liquid crystal deflection and changing the transmittance of the display panel. Moreover, when there is a certain voltage difference between the pixel electrode 31 and the first common electrode layer 2, the liquid crystal torsion state is smaller in a region with the slit structure 310 (e.g., a first sub-electrode part P1 and a second sub-electrode part P2 in FIG. 2A), while the liquid crystal torsion state is greater at the position where the block structure (e.g., a third sub-electrode part P1 and a fourth sub-electrode part P2 in FIG. 2A) is located. Thus, there is a brightness difference between different positions of the pixel electrode 31, and in conjunction with different liquid crystal alignments at different positions of the pixel electrode 31, eight different liquid crystal domain phases can be formed at different positions of two adjacent pixel electrodes 31, a level similar to that of 8-domain products can be achieved, and the color shift problem of the display panel can be improved.

In a possible implementation, referring to FIG. 2A or FIG. 3, the pixel electrode row 30 includes a first pixel electrode 311 and a second pixel electrode 312 arranged alternately along the first direction X; in different first pixel electrodes 311, positions of slit structures 310 are the same, and in different second pixel electrodes 312, positions of the slit structures 310 are the same; a position of the slit structure 310 in the first pixel electrode 311 is different from a position of the slit structure 310 in the second pixel electrode 312. In this way, in conjunction with different liquid crystal alignments at different positions of the pixel electrode 31, eight different liquid crystal domain phases can be formed at different positions of two adjacent pixel electrodes 31.

In a possible implementation, referring to FIGS. 2A-2C, the first pixel electrodes 311 may be located in the same column, and the second pixel electrodes 312 may be located in the same column.

In a possible implementation, referring to FIG. 3, within the same column of pixel electrodes 31, the first pixel electrode 311 and the second pixel electrode 312 may also be arranged alternately.

In a possible implementation, referring to FIGS. 2A-2C and FIG. 3, the pixel electrode 31 includes a first sub-electrode part P1, a second sub-electrode part P2, a third sub-electrode part P3 and a fourth sub-electrode part P4 arranged along the second direction Y. Among the first sub-electrode part P1, the second sub-electrode part P2, the third sub-electrode part P3 and the fourth sub-electrode part P4, only two of them have the slit structures 310.

Specifically, as shown by the bold arrows in FIG. 2A or FIG. 3, an included angle of the liquid crystal alignment direction at the first sub-electrode part P1 and the first direction X may be 45°, an included angle of the liquid crystal alignment direction at the second sub-electrode part P2 and the first direction X may be −45°, an included angle of the liquid crystal alignment direction at the third sub-electrode part P3 and the first direction X may be −135°, and an included angle of the liquid crystal alignment direction at the fourth sub-electrode part P4 and the first direction X may be 135°. In conjunction with the fact that part of regions of the pixel electrode 31 is a slit structure 310 and part of regions of the pixel electrode 31 is block structure, eight different liquid crystal domain phases can be formed at different positions of two adjacent pixel electrodes 31, and a level similar to that of 8-domain products can be achieved.

Specifically, as shown in FIG. 2B or FIG. 2C, a first alignment film 91 is arranged at a side of the pixel electrode 31 away from the substrate 1, an opposite substrate 5 opposite to the array substrate may be provided with a second common electrode layer 6, and a second alignment film 92 is arranged at a side of the second common electrode layer 6 away from the opposite substrate 5. Optionally, the first alignment film 91 and the second alignment film 92 are respectively aligned through ultraviolet ray to achieve the alignment direction as shown in FIG. 2A; or one of the first alignment film 91 and the second alignment film 92 is aligned through ultraviolet ray to achieve the alignment direction as shown in FIG. 2A; or only one alignment film, i.e. the first alignment film 91 or the second alignment film 92, is arranged in the display panel, and the alignment film arranged is aligned through ultraviolet ray to achieve the alignment direction as shown in FIG. 2A, which is not limited here.

Specifically, the first sub-electrode part P1, the second sub-electrode part P2, the third sub-electrode part P3, and the fourth sub-electrode part P4 are an integral communication structure, controlled by the same transistor. Slit structures are provided only at some positions, and liquid crystal alignments corresponding to different positions are different.

In a possible implementation, referring to FIGS. 2A-2C, among the first sub-electrode part P1, the second sub-electrode part P2, the third sub-electrode part P3 and the fourth sub-electrode part P4, the two having the slit structures 310 are adjacent to each other.

In a possible implementation, referring to FIG. 3, among the first sub-electrode part P1, the second sub-electrode part P2, the third sub-electrode part P3 and the fourth sub-electrode part P4, the two having the slit structures 310 are separated by the block structure.

In a possible implementation, referring to FIGS. 2A-2C and FIG. 3, among the first sub-electrode part P1, the second sub-electrode part P2, the third sub-electrode part P3 and the fourth sub-electrode part P4 within the same pixel electrode 31, the slit structures 310 in the two provided with the slit structures 310 have different extension directions. In this way, the liquid crystals are allowed to have different domain phases.

In a possible implementation, referring to FIG. 2A, the first sub-electrode part P1 and the second sub-electrode part P2 in the first pixel electrode 311 have a slit structure; the third sub-electrode part P3 and the fourth sub-electrode part P4 in the second pixel electrode 312 have a slit structure 310.

In a possible implementation, referring to FIG. 2A, an extension direction of the slit structure 310 of the third sub-electrode part P3 in the second pixel electrode 312 is the same as an extension direction of the slit structure 310 of the first sub-electrode part P1 in the first pixel electrode 311; an extension direction of the slit structure 310 of the fourth sub-electrode part P4 in the second pixel electrode 312 is the same as an extension direction of the slit structure 310 of the second sub-electrode part P2 in the first pixel electrode 311.

In a possible implementation, referring to FIG. 3, in the first pixel electrode 311, the first sub-electrode part P1 and the fourth sub-electrode part P4 have a slit structure 310; in the second pixel electrode 312, the second sub-electrode part P2 and the third sub-electrode part P3 have a slit structure 310.

In a possible implementation, referring to FIG. 3, an extension direction of the slit structure 310 of the second sub-electrode part P2 in the second pixel electrode 312 is the same as an extension direction of the slit structure 310 of the fourth sub-electrode part P4 in the first pixel electrode 311; an extension direction of the slit structure 310 of the third sub-electrode part P3 in the second pixel electrode 312 is the same as an extension direction of the slit structure 310 of the first sub-electrode part P1 in the first pixel electrode 311.

In a possible implementation, referring to FIG. 2A or FIG. 3, the first sub-electrode part P1, the second sub-electrode part P2, the third sub-electrode part P3 and the fourth sub-electrode part P4 have the same outer contour shape and equal areas.

Figure 4:
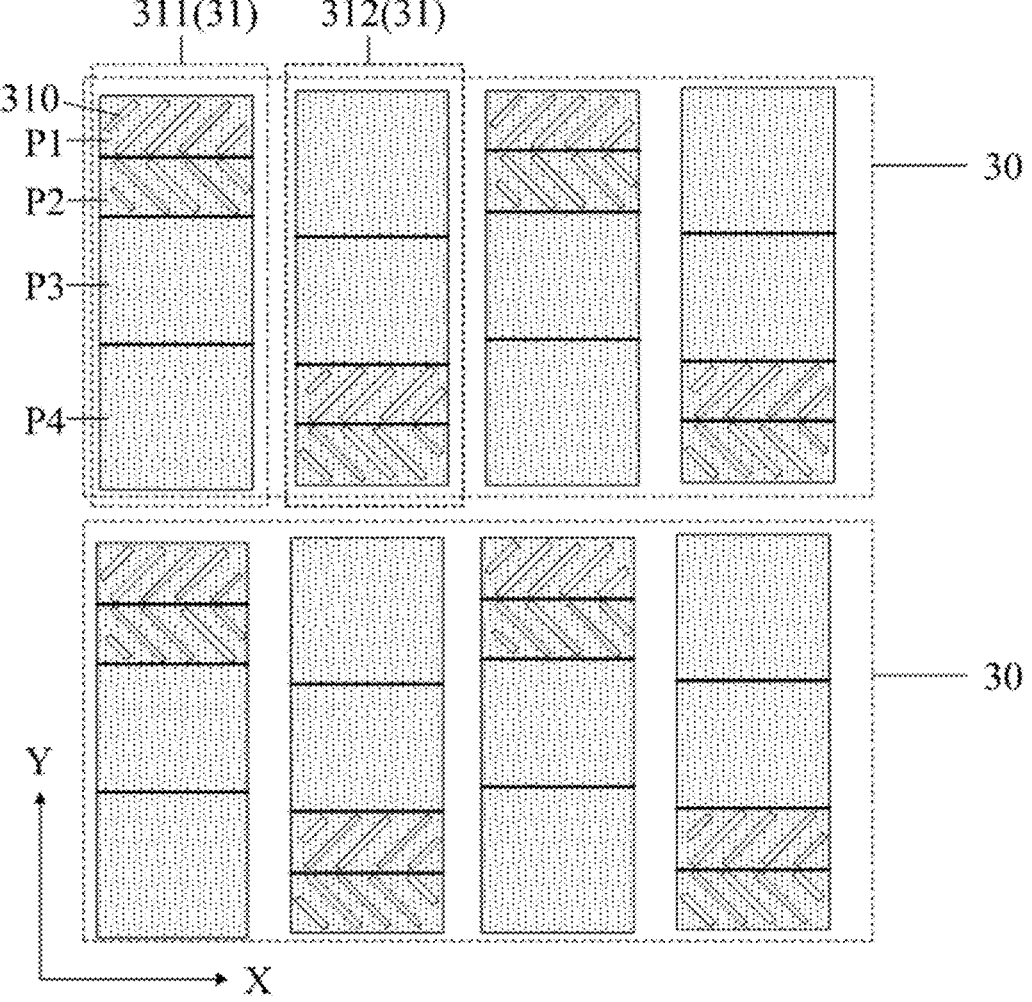
FIG. 4 is a third schematic top diagram of a pixel electrode layer provided by embodiments of the present disclosure.
Figure 5:
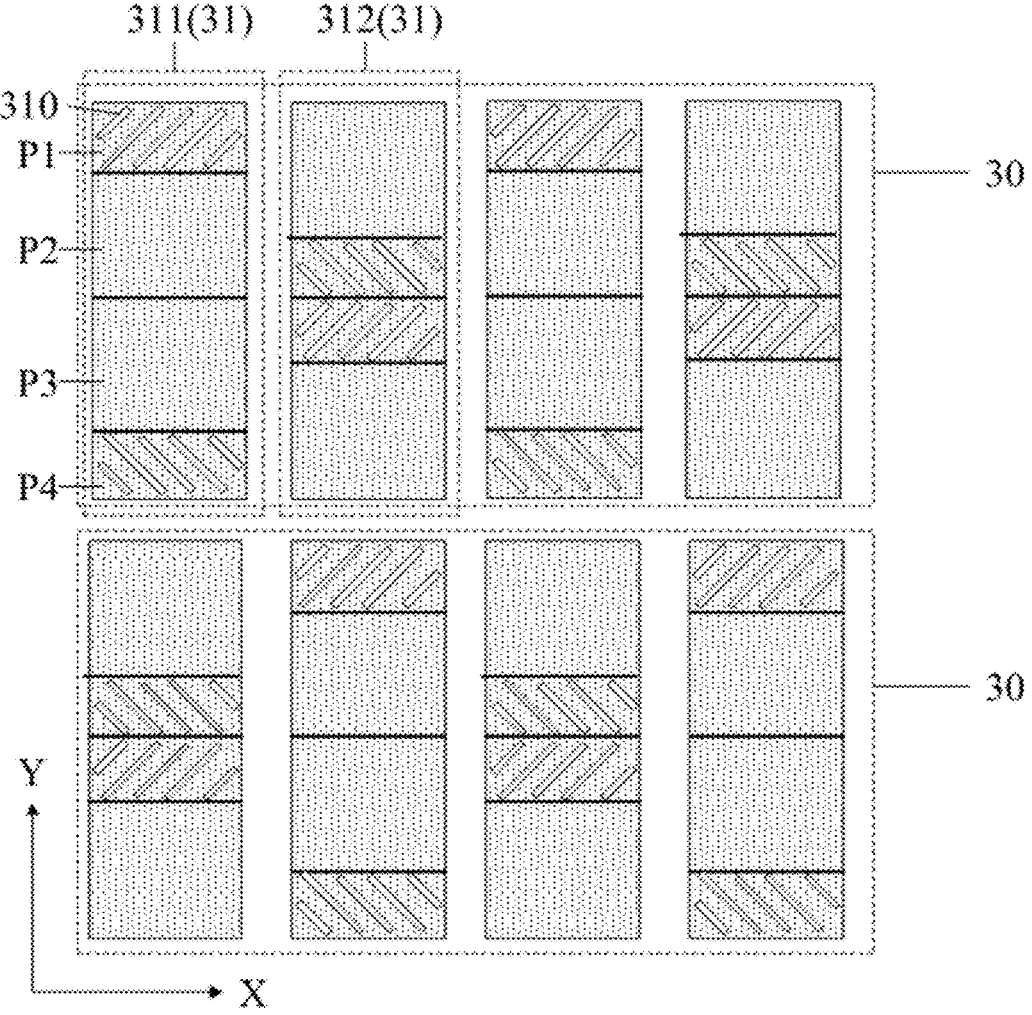
FIG. 5 is a fourth schematic top diagram of a pixel electrode layer provided by embodiments of the present disclosure.

In a possible implementation, referring to FIG. 4 or FIG. 5, in the same pixel electrode 31, the area occupied by the slit structure 310 may also be different from the area occupied by the block structure. Specifically, for example, the area occupied by the slit structure 310 may be smaller than the area occupied by the block structure, or the area occupied by the slit structure 310 may be larger than the area occupied by the block structure.

In a possible implementation, the first sub-electrode part P1, the second sub-electrode part P2, the third sub-electrode part P3, and the fourth sub-electrode part P4 may have the same outer contour shape but different areas; in a possible implementation, the first sub-electrode part P1, the second sub-electrode part P2, the third sub-electrode part P3, and the fourth sub-electrode part P4 may have different outer contour shapes but equal area; in a possible implementation, the first sub-electrode part P1, the second sub-electrode part P2, the third sub-electrode part P3, and the fourth sub-electrode part P4 may have different outer contour shapes and different areas. In the present disclosure, the color shift of the display panel can be adjusted and improved by adjusting the areas of the pixel electrodes with slits and the pixel electrodes without slits.

In a possible implementation, referring to FIG. 2B or FIG. 2C, the array substrate further includes: a data line layer 4 on a side of the first common electrode layer 2 away from the pixel electrode layer 3.

In a possible implementation, referring to FIG. 2B or FIG. 2C, the data line layer 4 includes a plurality of data lines 41 extending along the second direction Y; an orthographic projection of the pixel electrode 31 on the substrate 1 has an overlapping region with an orthographic projection of the data line 41 on the substrate 1. In the embodiments of the present disclosure, the first common electrode layer 2 is arranged at a side of the pixel electrode layer 3 facing the substrate 1, and the first common electrode layer 2 can shield signals therebelow, so the pixel electrode 31 may be designed without considering the interference caused by overlapping with other signals, the area of the pixel electrode 31 may be made larger than that of a conventional pixel electrode, and the pixel electrode 31 may have an overlapping region with an orthographic projection of the data line 41 on the substrate 1. When the array substrate is applied to a display panel, the liquid crystal capacitance of the display panel can be increased and the opening rate of the display panel can be improved.

In a possible implementation, referring to FIG. 2B or FIG. 2C, an orthographic projection of the first common electrode layer 2 on the substrate 1 covers an orthographic projection of the data line 41 on the substrate 1.

In a possible implementation, referring to FIG. 2B or FIG. 2C, a first insulating layer 81 may be disposed between the data line layer 4 and the pixel electrode layer 3, and the pixel electrode layer 3 and the first common electrode layer 2 may be provided with a second insulating layer 82.

In a possible implementation, the material of the first common electrode layer 2 is the same as the material of the pixel electrode layer 3. In a possible implementation, the pixel electrode layer 3 may be a transparent structure, and the material of the pixel electrode layer 3 may include metal oxides (e.g., indium tin oxide, indium-doped zinc oxide, fluorine-doped tin oxide, aluminum-doped zinc oxide (AZO), indium-doped cadmium oxide, etc.).

Based on the same inventive concept, referring to FIG. 2B or FIG. 2C, embodiments of the present disclosure further provide a display apparatus, including an array substrate as provided by the embodiments of the present disclosure, and further including an opposite substrate 5 opposite to the array substrate; the opposite substrate 5 is provided with a second common electrode layer 6. Optionally, a signal applied to the second common electrode layer 6 is the same as a signal applied to the first common electrode layer 2. Optionally, the second common electrode layer 6 is a plate-shaped electrode. Optionally, the second common electrode layer 6 is provided on the entire surface.

Specifically, the display apparatus may be: a mobile phone, a tablet computer, a television, a display, a notebook computer, a digital photo frame, a navigator, a smart watch, a fitness wristband, a personal digital assistant, or any other products or components that have display function. Those skilled in the art should understand that other essential components of the display apparatus are also provided, which will not be repeated here, and which should not be used to limit the present disclosure. In addition, since the principle of the display apparatus for solving the problem is similar to the principle of the above array substrate for solving the problem, for the implementation of the display apparatus, reference may be made to the embodiments of the above array substrate, which will not be repeated herein.

While preferred embodiments of the present disclosure have been described, additional changes and modifications to these embodiments can be made by those skilled in the art once the basic inventive concept is appreciated. Therefore, it is intended that the appended claims be construed to cover the preferred embodiments as well as all changes and modifications which fall within the scope of the present disclosure.

Apparently, those skilled in the art can make various modifications and variations to the embodiments of the present disclosure without departing from the spirit and scope of the embodiments of the present disclosure. In this way, if the modifications and variations of the embodiments of the present disclosure fall within the scope of the claims of the present disclosure and equivalent technologies, the present disclosure also intends to include these modifications and variations.

What is claimed is:

1. An array substrate, comprising:
a substrate;
a first common electrode layer on a side of the substrate; and
a pixel electrode layer on a side of the first common electrode layer away from the substrate, comprising a plurality of pixel electrode rows extending along a first direction and arranged along a second direction, wherein each of the pixel electrode rows comprises a plurality of pixel electrodes arranged along the first direction, part of regions of each of the pixel electrodes is a slit structure and part of regions of the pixel electrode is a block structure, and in a same pixel electrode row, slit structures of adjacent pixel electrodes are located at different positions in the adjacent pixel electrodes;
wherein,
the pixel electrode rows each comprise a first pixel electrode and a second pixel electrode arranged alternately along the first direction, and in a same column of pixel electrodes, a first pixel electrode and a second pixel electrode are arranged alternately; in different first pixel electrodes, positions of slit structures are the same, and in different second pixel electrodes, positions of slit structures are the same; a position of a slit structure in the first pixel electrode is different from a position of a slit structure in the second pixel electrode;
both the first pixel electrode and the second pixel electrode each comprise a first sub-electrode part, a second sub-electrode part, a third sub-electrode part and a fourth sub-electrode part arranged along the second direction;
only two of the first sub-electrode part, the second sub-electrode part, the third sub-electrode part and the fourth sub-electrode part have the slit structure; and
among the first sub-electrode part, the second sub-electrode part, the third sub-electrode part and the fourth sub-electrode part of the first pixel electrode, the two having the slit structure are separated by two adjacent block structures, and slit structures in the two provided with the slit structure have different extension directions; and
among the first sub-electrode part, the second sub-electrode part, the third sub-electrode part and the fourth sub-electrode part of the second pixel electrode, the two having the slit structure are adjacent to each other, two block structures are located at both ends of the two having the slit structure, respectively, and slit structures in the two provided with the slit structure have different extension directions.

2. The array substrate according to claim 1, wherein, in the first pixel electrode, the first sub-electrode part and the second sub-electrode part have the slit structure; in the second pixel electrode, the third sub-electrode part and fourth sub-electrode part have the slit structure.

3. The array substrate according to claim 1, wherein, an extension direction of the slit structure of the third sub-electrode part in the second pixel electrode is the same as an extension direction of the slit structure of the first sub-electrode part in the first pixel electrode; and
an extension direction of the slit structure of the fourth sub-electrode part in the second pixel electrode is the same as an extension direction of the slit structure of the second sub-electrode part in the first pixel electrode.

4. The array substrate according to claim 1, wherein, in the first pixel electrode, the first sub-electrode part and the fourth sub-electrode part have the slit structure; in the second pixel electrode, the second sub-electrode part and the third sub-electrode part have the slit structure.

5. The array substrate according to claim 4, wherein, an extension direction of the slit structure of the second sub-electrode part in the second pixel electrode is the same as an extension direction of the slit structure of the fourth sub-electrode part in the first pixel electrode; and
an extension direction of the slit structure of the third sub-electrode part in the second pixel electrode is the same as an extension direction of the slit structure of the first sub-electrode part in the first pixel electrode.

6. The array substrate according to claim 1, wherein, the first sub-electrode part, the second sub-electrode part, the third sub-electrode part and the fourth sub-electrode part have a same outer contour shape and equal areas.

7. The array substrate according to claim 1, wherein, the array substrate further comprises: a data line layer on a side of the first common electrode layer away from the pixel electrode layer.

8. The array substrate according to claim 7, wherein, the data line layer comprises a plurality of data lines extending along the second direction; an orthographic projection of the pixel electrode on the substrate has an overlapping region with an orthographic projection of the data line on the substrate.

9. The array substrate according to claim 8, wherein, an orthographic projection of the first common electrode layer on the substrate covers the orthographic projection of the data line on the substrate.

10. The array substrate according to claim 1, wherein, a material of the first common electrode layer is the same as a material of the pixel electrode layer.

11. A display apparatus, comprising
the array substrate according to claim 1, and
an opposite substrate opposite to the array substrate; wherein the opposite substrate is provided with a second common electrode layer, and a signal applied to the second common electrode layer is the same as a signal applied to the first common electrode layer.

* * * * *